(12) United States Patent
Fernandez et al.

(10) Patent No.: US 9,327,535 B2
(45) Date of Patent: May 3, 2016

(54) PRINT MASKS FOR MULTIPLE PASS PRINT MODES

(75) Inventors: Jaime Fernandez, San Diego, CA (US); Yngvar Rossow, Sant Cugat del Valles (ES); Utpal Sarkar, Sant Quirze del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/423,813

(22) PCT Filed: Sep. 6, 2012

(86) PCT No.: PCT/EP2012/067397
§ 371 (c)(1),
(2), (4) Date: Feb. 25, 2015

(87) PCT Pub. No.: WO2014/037040
PCT Pub. Date: Mar. 13, 2014

(65) Prior Publication Data
US 2015/0273908 A1 Oct. 1, 2015

(51) Int. Cl.
*B41J 2/015* (2006.01)
*B41J 29/38* (2006.01)
*B41J 2/145* (2006.01)
*B41J 2/135* (2006.01)
*G06K 15/10* (2006.01)

(52) U.S. Cl.
CPC ............. *B41J 29/38* (2013.01); *G06K 15/105* (2013.01)

(58) Field of Classification Search
CPC ...... B41J 29/393; B41J 2/04535; B41J 2/125; B41J 2/04585
USPC ..................................... 347/9, 20, 40–41, 44
See application file for complete search history.

(56) References Cited

U.S. PATENT DOCUMENTS

| | | | |
|---|---|---|---|
| 6,764,162 | B2 | 7/2004 | Biddle et al. |
| 7,452,047 | B2 | 11/2008 | Heydinger |
| 2006/0109291 | A1* | 5/2006 | De Pena ................. B41J 2/2132 347/12 |
| 2009/0027696 | A1 | 1/2009 | Quintana et al. |

FOREIGN PATENT DOCUMENTS

| | | |
|---|---|---|
| EP | 0992937 | 4/2000 |
| EP | 1658979 | 5/2006 |
| JP | 11254753 | 9/1999 |
| WO | WO-2009015921 | 2/2009 |

OTHER PUBLICATIONS

European Patent Office, International Search Report and Written Opinion for PCT/EP2012/067397 dated Jun. 3, 2013 (9 pages).
The International Bureau of WIPO, International Preliminary Report on Patentability for PCT/EP2012/067397 dated Mar. 19, 2015 (8 pages).

* cited by examiner

*Primary Examiner* — Jason Uhlenhake
(74) *Attorney, Agent, or Firm* — HP Inc. Patent Department

(57) ABSTRACT

Print masks for multiple pass print modes are described herein. In at least some examples herein, the print mask includes mask matrices. The mask matrices define a single nozzle actuation pattern. The nozzle actuation pattern is irregular. In at least some examples herein, techniques for printing of an image on a substrate are described. During printing the image on the substrate a print mask is applied such that, for each pass, the inkjet nozzles in the print head are actuated according to the single nozzle actuation pattern.

20 Claims, 9 Drawing Sheets

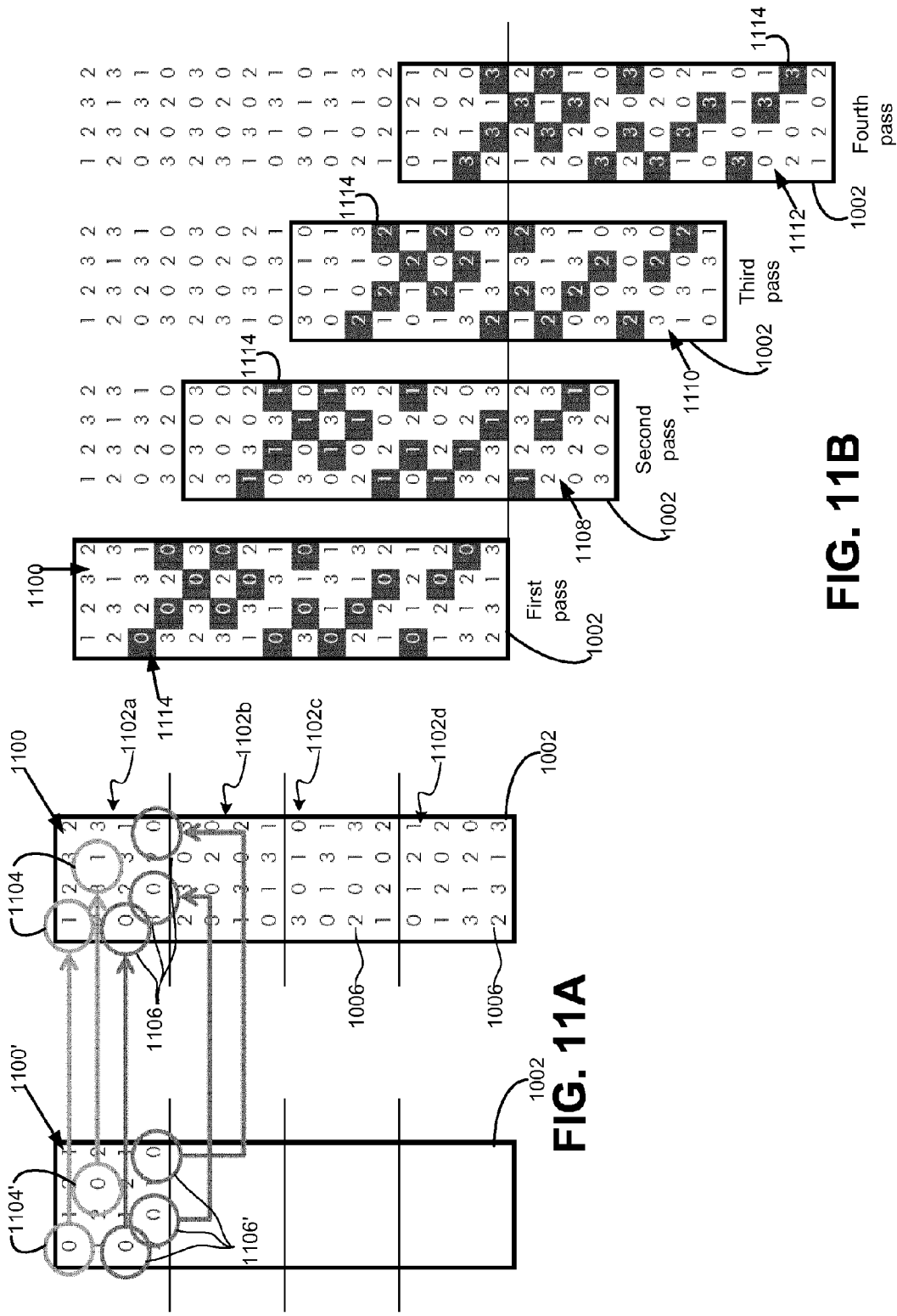

PRINT MASKS FOR MULTIPLE PASS PRINT MODES

BACKGROUND

Inkjet printers print dots by ejecting very small drops of ink onto a print substrate. In inkjet printers, the print substrate is traversed beneath one or more print cartridges, each having a printhead with a nozzle array. The nozzle array has an array length along the direction of substrate transition. Ink ejecting nozzles may be disposed along this length.

An ink supply, such as an ink reservoir, supplies ink to the nozzles. The nozzles are controlled to eject drops of ink at appropriate times pursuant to command of a microcomputer or other controller. The timing of the application of the ink drops is intended to correspond to the pattern of pixels of the image being printed. In some inkjet printers, the print cartridges are mounted on a movable carriage. During printing, the carriage traverses over the surface of the print substrate for printing a portion of the image equivalent to a printhead swath. In some other inkjet printers, the printhead is a page wide array printhead that spans the whole portion of the substrate to be printed. During printing, nozzles in a page wide array printhead are selectively fired to reproduce the image on the substrate.

Inkjet printers may be operated using a multi-pass print mode (also referred to as shingling). In multi-pass print mode for printers with scanning printheads, the media only advances a fraction of the total length of a nozzle array after each printing pass of the printhead. In multi-pass print mode for printers with page wide array printheads, the media only advances a fraction of the total length of a nozzle array after the nozzles in the printhead are selectively fired. In a multi-pass print mode, each strip of the image to be printed is formed in successive passes of the printheads. Multi-pass print modes facilitate enhancing quality of a printed image. For example, multi-pass print modes facilitate decreasing the ink amount to be applied on a substrate region at a single time, thereby promoting ink absorption by the substrate. Further, multi-pass print modes are, generally, more robust to defects and non-uniformities in nozzles.

A print mode may have a number of parameters such as the number of passes required to fill an area, and the position of the ink droplets at every pass. To define such features, a print mask may be created that defines each position of each pass in which a drop may print. A print mask refers to logic that includes control data determining which nozzles of the different printheads are fired at a given time to eject fluid in order to reproduce a specific printjob. A print mask for an inkjet printer in multi-pass print mode is also referred to as shingling mask.

BRIEF DESCRIPTION OF THE DRAWINGS

In order that the present disclosure may be well understood, various examples will now be described with reference to the following drawings.

FIGS. 11A and 11B shows diagrams of mask matrices for printheads according to examples.

DETAILED DESCRIPTION

Figure 1:
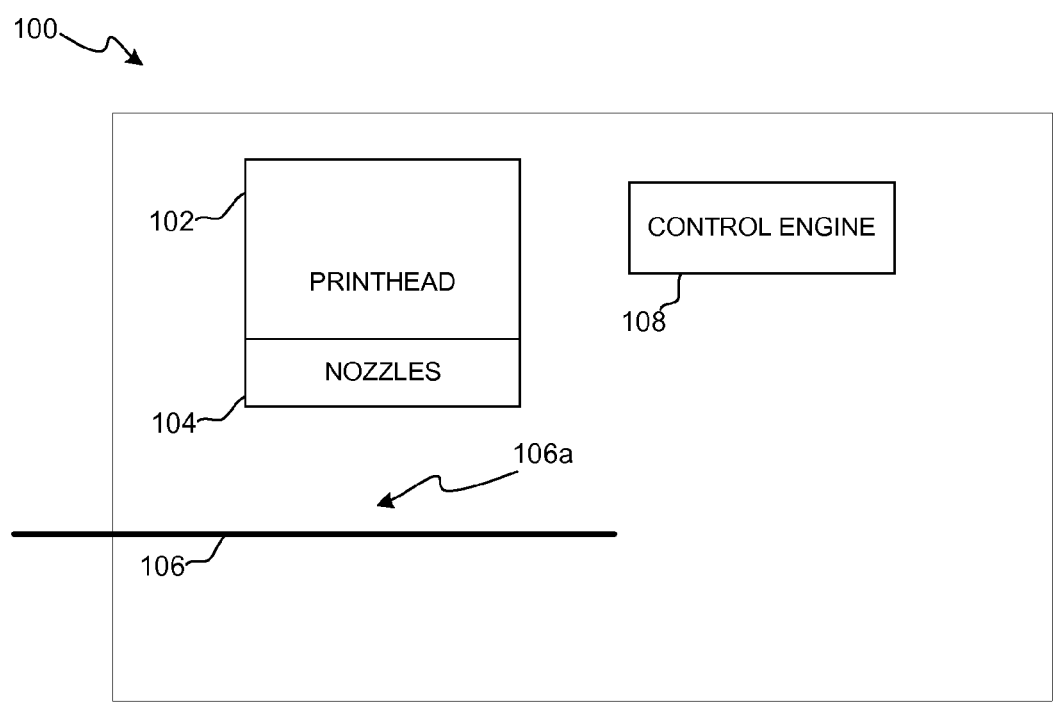
FIG. 1 is a block diagram schematically illustrating printing systems according to examples.

In the following description, numerous details are set forth to provide an understanding of the examples disclosed herein. However, it will be understood that the examples may be practiced without these details. While a limited number of examples have been disclosed, it should be understood that there are numerous modifications and variations therefrom. Like numerals are used for like and corresponding parts of the various figures.

As set forth above, printers may be operated using a multi-pass print mode. Each printing pass sub-samples the image by using a multi-pass print mask (hereinafter also referred to as shingling mask). Shingling masks facilitate distributing the location errors of the individual ink drops caused by nozzle or nozzle firing abnormalities or other system errors. Such misplaced drops are blended with other normal ink drops, making the misplaced drops more difficult to detect. Multi-pass printing also facilitates making banding (a visual effect that may affect inkjet printers) less visible and less objectionable to human visual systems. Generally, the larger number of passes made using the multi-pass process, the better the print quality can be. However, increasing the number of passes may involve a substantial penalty in throughput.

When printing in multi-pass mode, the distance that a substrate portion traverses below a printhead can be any distance less than the height of a printing swath. Generally, this distance is an integer fraction of a printing swath. An example would be four-pass printing. In a four-pass printing mode with a swath height of 16 scanlines (i.e., the number of lines of nozzles arranged on the printhead along a substrate transition direction), the distance traversed by the substrate might be the equivalent to 4 scanlines. In a 4-pass printing mode, each pixel location (i.e., the smallest discrete component of the printed image) will be passed four times over by a nozzle (or nozzle sub-group) responsible to deposit ink on an individual pixel location during a single pass. A shingling mask may be designed to prevent that a pixel location receives more than the desired amount of ink. Further, a shingling mask may be designed to facilitate that each pixel location receives at least some ink at each substrate transition.

An unordered random pixel location arrangement may be used to generate shingling masks that facilitate higher printing speeds and reduce memory usage. For example, blue noise may be used to generate shingling masks. Moreover, unordered random pixel location arrangements facilitate some operations such as error-hiding. Such random shingling masks may convey different nozzle actuation patterns for each pass. However, it might be the case that different nozzle actuation patterns for each pass cause printing artifacts, in particular when substrate advance errors are produced during printing. Moreover, the visibility of such artifacts may be increased due to a different pattern being revealed over each swath. Further, in at least some printing systems, a new binary mask has to be created or loaded for each pass. Furthermore, when performing operations such as error-hiding, the mask has to be recalculated.

Therefore, it is convenient to provide a printing mask that provides advantages associated with unordered random pixel location arrangements and prevents increase of visibility of artifacts due to a different pattern being revealed over each swath without impacting computational efforts.

Examples herein facilitate printing an image on a substrate. In some examples a shingling mask is applied such that, for each pass, the inkjet nozzles in the printhead are actuated according to a single nozzle actuation pattern. The nozzle actuation pattern is irregular. An irregular printing pattern refers to a printing pattern that is not composed from a basic sub-mask, which is tiled over the printhead length so as to compose a full-mask.

Examples of shingling masks described herein prevent artifacts associated with use of different actuation patterns for each pass. Further, such shingling masks facilitate computational efficiency: having a single pattern, the computational effort associated with applying shingling masks might be reduced by a factor P, P being the number of passes. Such a computational cost reduction may be particularly advantageous when complex operations are to be implemented in the print mask, or for printers with limited memory or processing power capabilities.

FIG. 1 schematically illustrates a printing system 100 according to examples. Printing system 100 may be constituted by any type of inkjet printer, including any type of image reproduction devices based on inkjet printing (e.g., image scanners that reproduce a scanned image by inkjet printing).

Printing system 100 includes a printhead 102 with inkjet nozzles 104 for printing on a region 106a of a substrate 106. It will be understood that printing system 100 may include any number of printheads. Printing system 100 further includes a control engine 108.

Printhead 102 may be constituted by any type of printhead suitable for ink jetting ink in order to reproduce an image. Specific examples of printheads are illustrated with respect to FIGS. 2 to 4. In those examples, scanning printheads are illustrated. It will be understood that examples herein also encompass other types of printheads such as page wide printheads. Control engine 108 represents generally any combination of hardware and programming configured to control ejection of ink through the inkjet nozzles in a multiple P pass print mode in a manner such that, for each pass, the inkjet nozzles are actuated according to the same nozzle actuation pattern. A control engine according to examples herein may be implemented in a number of fashions, one example thereof being illustrated below with respect to FIG. 5.

Figure 5:
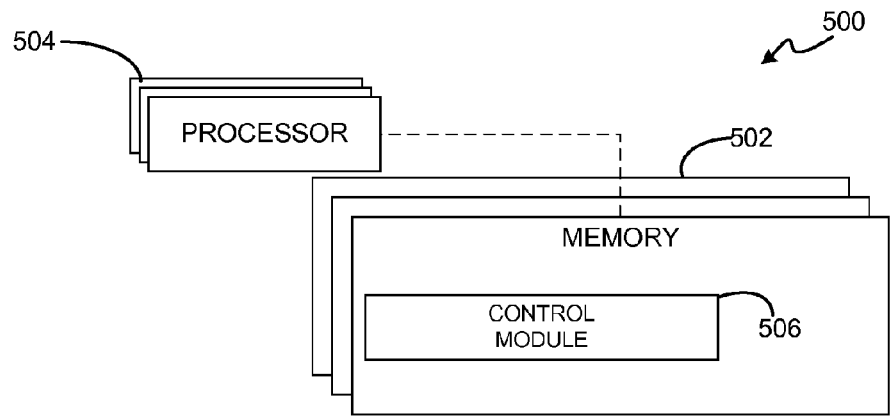
FIG. 5 shows a block diagram of a system for causing a printing system (e.g., the printing system in FIG. 2) to print an image on a substrate according to examples.

FIG. 5 depicts a specific example of control engine 108 and, more specifically, of a system 500 for causing a printing system to print an image on a substrate. As illustrated by system 500, the programming referred to above may be processor executable instructions stored on a tangible memory media 502 and the hardware may include a processor 504 for executing those instructions. Memory 502 implements a non-transitory medium readable by processor 504. Memory 502 can be said to store program instructions that when executed by processor 504 implement control engine 108. Memory 502 may be integrated in the same device as processor 504 or it may be separate but accessible to that device and processor 504. Each of memory 502 and processor 504 may be respectively integrated in a single system component or may be distributed among multiple system components.

In an example, the program instructions can be part of an installation package that can be executed by processor 504 to implement control engine 108. In this case, memory 502 may be a portable medium such as a CD, DVD, or flash drive or a memory maintained by a server from which the installation package can be downloaded and installed. In another example, the program instructions may be part of an application or applications already installed. Here, memory 502 can include an integrated memory such as a hard drive.

In FIG. 5, the executable program instructions stored in memory 502 are depicted as control module 506. Control module 506 represents program instructions that when executed by a processor cause the implementation of control engine 108.

Figure 2:
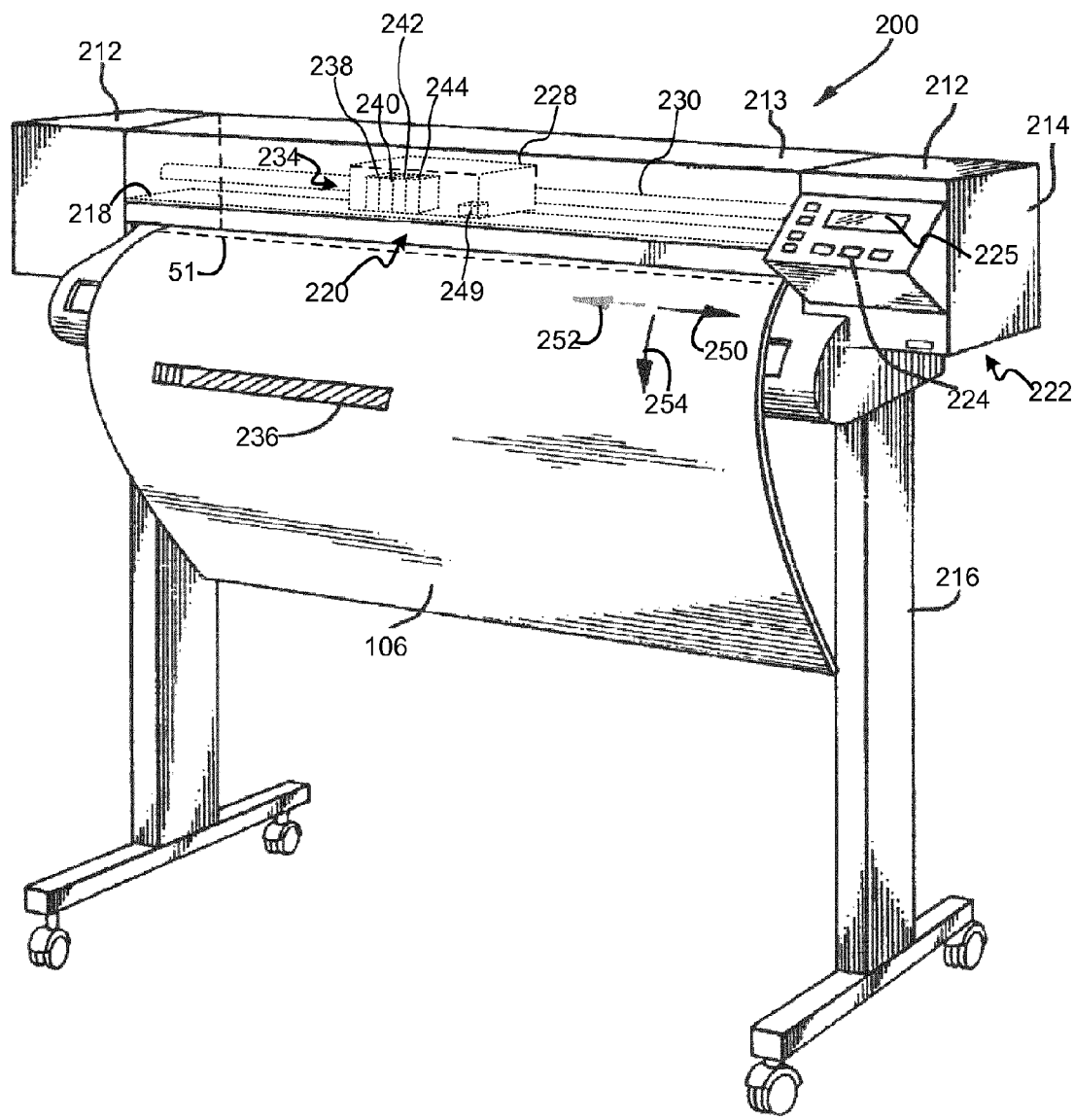
FIG. 2 shows a schematic view of a printing system according to examples.

In the following, reference is made to FIGS. 2 and 3 for illustrating some specific examples of printing systems according to examples herein. FIG. 2 shows a schematic view of a printing system 200 according to an example. Printing system 200 is exemplified as an industrial printer, i.e., a printer designed for use in: a) manufacturing, b) production lines, and/or c) large scale printing (both size and production) printing. Printing system 200 may be, for example, an inkjet plotter. It will be understood that a printing system as used herein is not limited to an industrial printer, but also may include other types of printing systems such as, but not limited to, printers for printing small/average size printing media (e.g., desktop printers or portable printers).

Printing system 200 includes a housing 212 enclosing a chassis (not shown) forming a print assembly 214. Print assembly 214 is supported by a leg assembly 216. It will be understood that print assembly 214 may be designed to be supported by a desktop during operation. A print media transport assembly 218 feeds a print substrate 106 through a print zone 220 and advances print substrate 106 in a media advance direction 254. Printing system 200 includes a user terminal 222 for receiving user inputs through, e.g., a keypad 224, and providing visual feedback to the user through, e.g., a display 225. It will be understood that user interaction may be implemented by other suitable means such as a personal computer operatively connected to printing system 200.

A carriage 228 is slidably mounted on a guide rod 230. Guide rod 230 defines a carriage transition axis (parallel to scanning directions 252, 250) along which carriage 228 traverses over print zone 220 for performing printing. A carriage drive 332 (shown in FIG. 3) actuates carriage 228 for effecting the carriage transition. Thereby, carriage 228 is reciprocally translatable in a forward direction 250 (e.g., left-to-right) and a backward direction 252 (e.g., right-to-left) over print zone 220. Carriage 228 and guide rod 230 are enclosed by a hood 213.

Carriage 228 includes positions for receiving respective printheads therein. As used herein, a printhead is a device including a group of nozzles (such as nozzle array 326 depicted in FIG. 3) through which ink drops can be ejected. As used herein, "ink" refers to a solution composition that includes a liquid vehicle and a colorant for reproducing an image on a print substrate.

In the example illustrated in FIG. 2, carriage 228 includes four positions for a printhead assembly 234. Printhead assembly 234 is operated for ejecting ink so as to print a printing pattern 236 on print substrate 106. Printhead assembly 234 includes four ink printheads 238, 240, 242, 244. Each of the printheads is for ejecting a basic color ink (e.g., cyan ink, magenta ink, yellow ink, or black ink). It will be understood that printhead assembly 234 may include further positions either for ink printheads and/or treatment printheads. Further examples of configurations of carriage 228 are illustrated below in a non-limiting manner with respect to FIG. 3. Ink printheads 238, 240, 242, 244 are configured for ejecting ink through one or more nozzles over a print area. Carriage 228 may also include an alignment sensor 249 for estimating alignment of a printhead.

Figure 3:
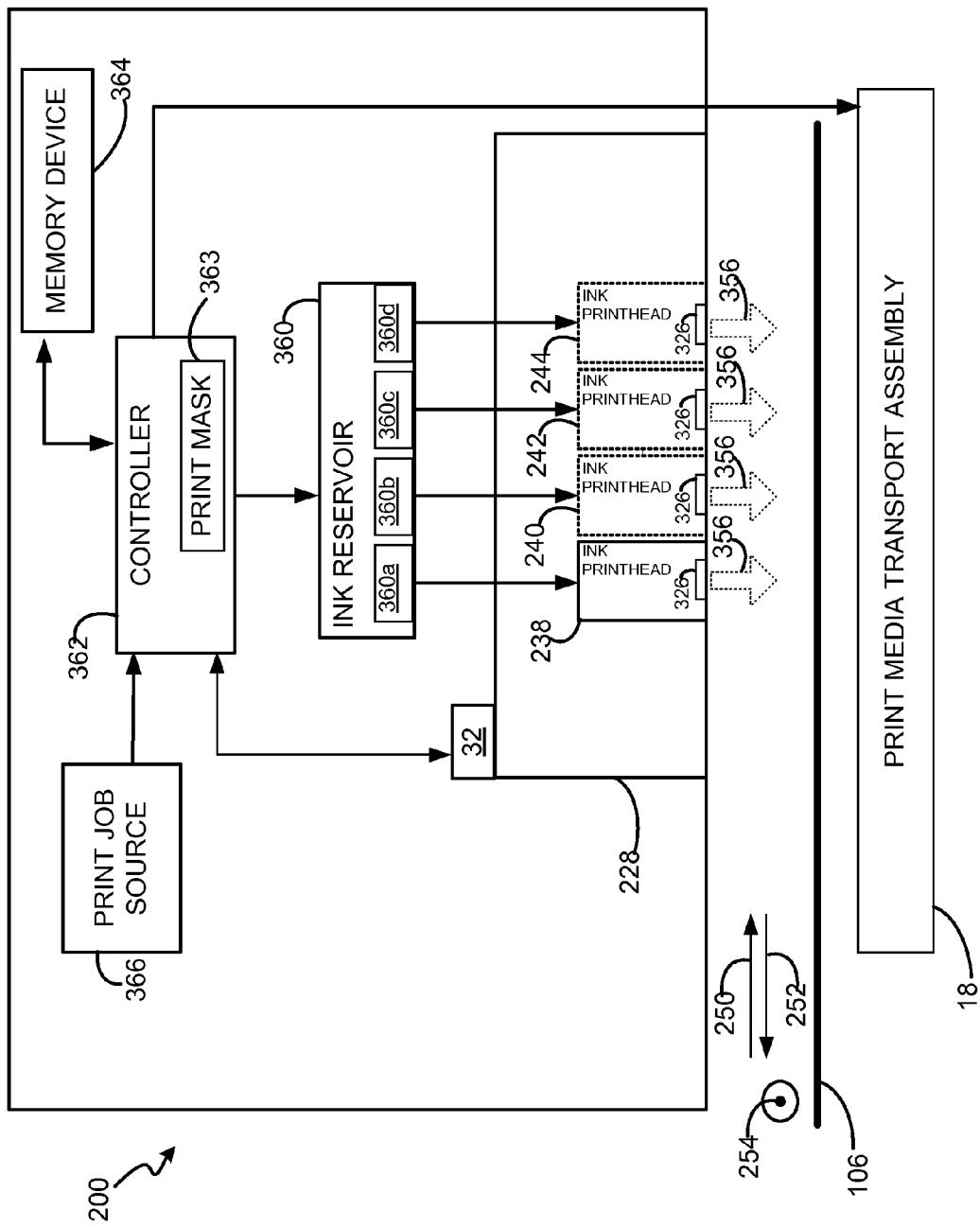
FIG. 3 shows a block diagram representation of the printing system in FIG. 2.

FIG. 3 is a block diagram of a printing system 200. As shown in the diagram, each of ink printheads 238, 240, 242, 244 is configured to eject ink 356 of a different color through nozzle arrays 326. In particular, ink printheads 238, 240, 242, 424 are fluidly connected to an ink reservoir 360. Ink reservoir 360 includes separated ink reservoirs 360a, 360b, 360c, 360d for providing ink to the respective ink printhead. In the illustrated example, separated ink reservoirs 360a, 360b, 360c, 360d respectively store cyan ink, magenta ink, yellow ink, and black ink. Base colors are reproduced on print substrate 106 by depositing a drop of one of the above mentioned inks corresponding to the desired base color onto a dot location. A plurality of ink printheads facilitates reproduction of secondary colors by combining ink from different ink printheads. In particular, secondary or shaded colors are reproduced by depositing drops of different base colors on adjacent dot locations; the human eye interprets the color mixing as the secondary color or shading.

Ink reservoir 360 may include disposable cartridges (not shown). The reservoirs may be mounted on carriage 228 in a position adjacent to the respective printhead. In other configurations (also referred to as off-axis systems), a small fluid supply (ink or treatment) is provided to cartridges (not shown) in carriage 228, each cartridge being associated to a respective printhead; main supplies for ink and fixer are then stored in the respective reservoirs. In an off-axis system, flexible conduits are used to convey the fluid from the off-axis main supplies to the corresponding printhead cartridge. Printheads and reservoirs may be combined into single units, which are commonly referred to as "pens".

Printheads 238, 240, 242, 244 may be arranged according to a linear configuration, in which the printheads are aligned along the direction of carriage transition (e.g., carriage transition axis 251). Such a linear configuration is illustrated in FIG. 2. The printheads may be arranged in a staggered configuration, in which the printheads are partially offset from an ink printhead along an axis coincident with media advance direction 254.

A controller 362 based on an electronic processor unit is configured for being operatively connected to the above described elements of printing system 200 as well as a memory device 364 and a printjob source 366. Controller 362 is configured to execute methods according to the present disclosure. More specifically, controller 362 in conjunction with memory device 364 may implement the functionality of control engine 108.

Controller 362 may be implemented, for example, by one or more discrete modules (or data processing components) that are not limited to any particular hardware, firmware, or software (i.e., machine readable instructions) configuration. Controller 362 may be implemented in any computing or data processing environment, including in digital electronic circuitry, e.g., an application-specific integrated circuit, such as a digital signal processor (DSP) or in computer hardware, firmware, device driver, or software (i.e., machine readable instructions). In some implementations, the functionalities of the modules are combined into a single data processing component. In other versions, the respective functionalities of each of one or more of the modules are performed by a respective set of multiple data processing components.

Memory device 364 is accessible by controller 362. Memory device 364 stores process instructions (e.g., machine-readable code, such as computer software) for implementing methods executed by controller 362 as well as data that controller 362 generates or processes such as alignment correction data. Memory device 364 may be physically constituted analogously as memory 502 illustrated above with respect to FIG. 5.

Controller 362 receives printjob commands and data from printjob source 366, which may be a computer or any other source of printjobs, in order to print an image. In the example, controller 362 is configured to determine and/or reproduce a print mask 363 from the received data. The received data itself may already correspond to print mask 363. In other examples, a print mask may be dynamically generated during printing of a print job. Print mask 363 may also be stored from the outset in memory 364. Controller 362 may then dynamically access the print mask during execution of a print job.

Figure 4:
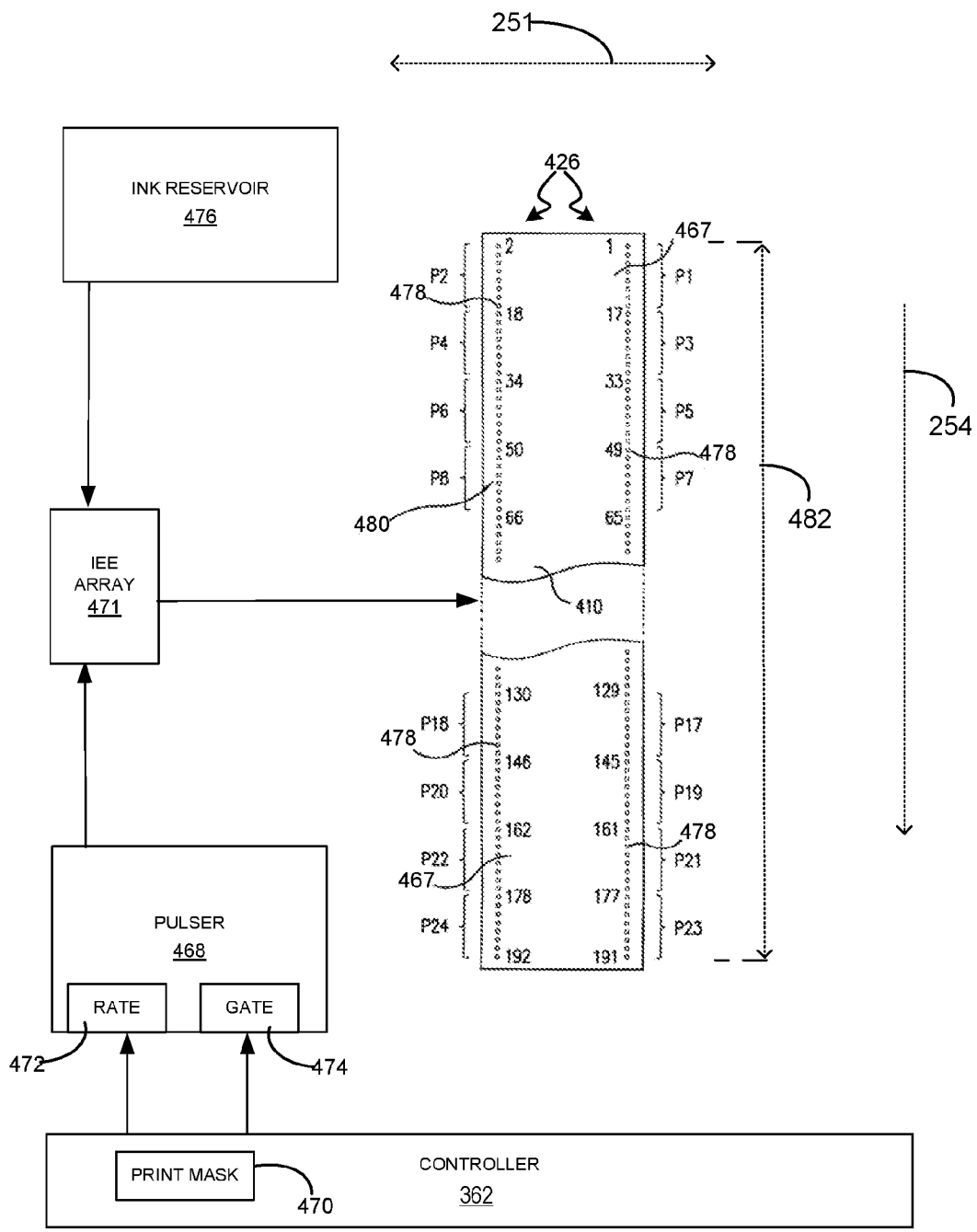
FIG. 4 shows a block diagram of a portion of the printing system in FIG. 2 illustrating examples of printhead firing control.

FIG. 4 is a block diagram of a portion of printing system 200 illustrating an example of printhead firing control. The example is illustrated for a printhead 467, which may correspond to any of ink printheads 238, 240, 242, 244. Controller 362 may provide a print mask 470 to a pulser 468. Pulser 468 may be located on or off printhead 467 depending on the particular printing system. Pulser 468 may process data from print mask 470 to generate pulses that controls an ink ejection element (IEE) array 471 associated to nozzle array 426. IEE array 471 includes IEEs (not shown) operatively coupled to a nozzle or a group of nozzles in nozzle array 326. In the illustrated example, controller 362 provides firing data to pulser 468 on two lines: i) a rate line 472 for setting the pulse rate; and ii) a gate line 474 for setting which pulses are to be forwarded to a particular IEE. Electrodes (not shown) on carriage 228 may forward the pulses.

The particular fluid ejection mechanism within the printhead may take on a variety of different forms such as those using piezo-electric or thermal printhead technology. For example, if the fluid ejection mechanism is based on a thermal printhead technology, the pulses forwarded to an IEE of IEE array 471 may be forwarded as a current pulse that is applied to a resistor within the particular IEE. The current pulse causes a fluid droplet (not shown), formed with fluid (i.e., ink or treatment fluid) from a fluid reservoir 476 (e.g., ink reservoir 360), to be emitted from the nozzle associated with the particular IEE.

FIG. 4 further illustrates a particular arrangement of a printhead 467. The depicted elements of printhead 467 are not to scale and are exaggerated for simplification. Printhead 467 includes a nozzle array 426 formed by individual nozzles 478. Nozzles 478 may be of any size, number, and pattern. A fluid ejection chamber (not shown) may be located behind nozzles 478 and contains IEEs associated to nozzles 478. A specific group of nozzles (hereinafter referred to as a primitive 480) may be allocated for being fired simultaneously (such primitives are also referred to herein as nozzle sub-groups). A primitive may be comprised of a single nozzle, if only one nozzle is fired to deposit in on a single pixel location. Nozzle array 426 may be arranged into any number of multiple subsections with each subsection having a particular number of primitives operated by a particular number of IEEs. In the illustrated example, printhead 467 has 192 nozzles with 192 associated firing IEEs; the 192 nozzles (nozzles 1 to 192) are allocated in 24 primitives (primitives P1 to P24) arranged in two columns of 12 primitives each.

The length of the rows of nozzles along the media advance direction defines a print swath 482. The width of this band along media advance direction 254 is commonly referred to as the "swath width," which defines the maximum pattern of ink which can be laid down in a single transition of carriage 228.

A printer such as printing system 200 can be operated according to a multi-pass print mode. As set forth above, in a multi-pass print mode, the media only advances a fraction of the total length of a nozzle array after each printing pass of the printheads. For example, the media may be advanced a length corresponding to the length of one or more of primitives 480. Thereby, each strip of the image to be printed is formed in successive passes of the printheads.

Ink may be applied when the carriage travels in one direction along the scan axis of carriage 228. Alternatively, printing may be bidirectional in that ink may be applied on a print area when the carriage travels in a "forward pass" and also when travelling in a "backward pass." The print medium may be advanced after each pass or after both passes have been completed.

Figure 6:
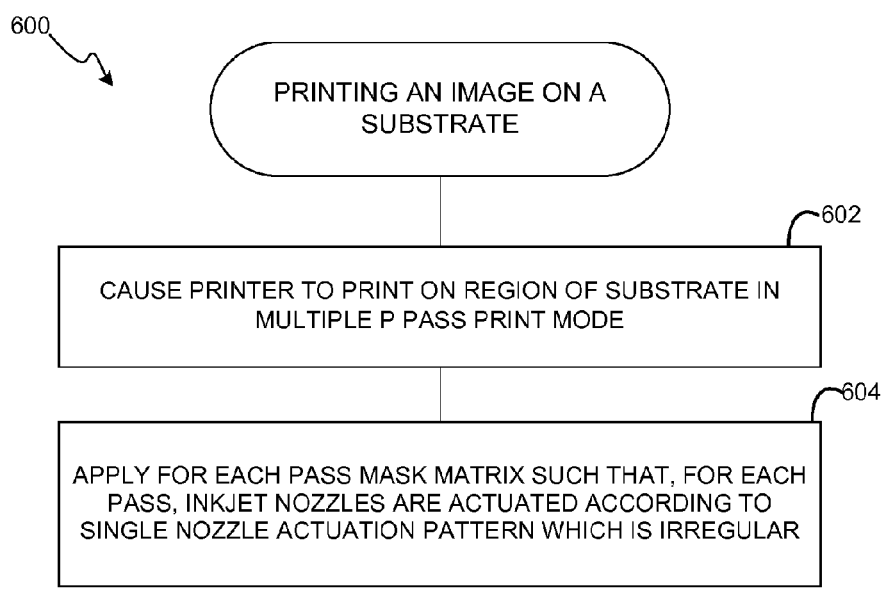
FIG. 6 shows a flow chart that implements examples of methods for causing printing systems to print an image on a substrate.

In the following, operation of printing systems according to examples herein is illustrated with respect to FIG. 6. FIG. 6 shows a flow chart 600 that implements examples of methods for causing a printer (e.g., any of printer systems 100, 200) to print an image on a substrate. In discussing FIG. 6 reference is made to the flow diagrams of FIGS. 7 to 9, which illustrate examples of generation of print masks. Further, FIGS. 10A to 11B provide contextual examples of generation and usage of print masks. It will be understood that implementations, however, are not limited to those examples.

Referring to FIG. 6, flow chart 600 is to cause a printer to print an image on a substrate. Control engine 108 in FIG. 8 may be responsible of implementing blocks in flow chart 600. The printer operated by flow chart 600 includes at least one printhead having a plurality N of inkjet nozzles or inkjet nozzle sub-groups. Each of these N inkjet nozzles or inkjet nozzle sub-groups is responsible to deposit ink on an individual pixel location during a single pass. They may then correspond to the primitives mentioned above with respect to FIG. 4. Looking at that example, printhead 467 has 24 inkjet nozzle sub-groups responsible to deposit ink on an individual pixel location during a single pass. In the examples of FIGS. 10A to 11B, printhead 1002 contains 64 of these inkjet nozzles or inkjet nozzle sub-groups, which are hereinafter also referred to as primitives.

At block 602, the printer is caused to print on a region of a substrate (e.g., substrate 104) in a multiple P pass print mode. Referring to the examples, of FIGS. 10A to 11B, the multiple P pass print mode depicted therein correspond to a four pass print mode. That is, primitives of printhead 1002 are located four times beneath each pixel location in a region of the substrate to be printed. Further details on the examples of these Figures are illustrated below.

At block 604, a print mask is applied such that, for each pass, the inkjet nozzles in the printhead are actuated according to a single nozzle actuation pattern. A nozzle actuation pattern refers to the spatial distribution of nozzles being fired at a single pass. Nozzle actuations patterns are illustrated with respect to FIGS. 10B and 11B. (In these figures, the nozzle actuations pattern for each pass corresponds to the highlighted patterns.) As can be observed, for each of pass one to fourth a single nozzle actuation pattern is used at each respective example. Further details on the examples of these Figures are illustrated below.

In examples herein, the nozzle actuation pattern resulting from a print mask as described is irregular. An irregular printing pattern refers to a printing pattern that is not composed from a basic sub-mask, which is tiled over the printhead length so as to compose a full-mask. An irregular printing pattern facilitates relatively highly complex operations such as error hiding. In contrast thereto, print masks generated through tessellation of a basic sub-mask may render it difficult to perform relatively highly complex operations.

In some examples, a printed mask (such as the one used at block 604) includes a mask matrix sized to match the arrangement of inkjet nozzles. More specifically, the print mask may include a matrix with each position the mask matrix corresponding to primitives in the printhead. Each mask matrix position contains information as to when a primitive is to be fired. Examples of such mask matrices are illustrated below with respect to FIGS. 10A to 11B.

In some examples, an applied printed mask (such as the one used at block 604) is a non-weighted print mask. A non-weighted print mask refers to a print mask that is not constrained by a print mask function that weights the probability of using specific nozzles. An example of a non-weighted print mask is illustrated with respect to FIGS. 10A and 10B. Generally, non-weighted print masks are easier to generate and require a lower computing cost at the time of generating the mask. Further, non-weighted print masks as described herein that cause using the same actuation pattern for each pattern may be particularly easy to generate since mask matrices for each pass can be easily derived from a basic matrix.

In some examples, an applied printed mask (such as the one used at block 604) is a weighted print mask. A weighted print mask refers to a print mask that is constrained by a print mask function that weights the probability of using specific nozzles. For example, a print mask function may be applied to generate a weighted print mask that include some refinements such as blue noise, nozzle tapers, or pen windowing. FIGS. 11A and 11B, described below, illustrate examples of a weighted print mask, more specifically a tapered mask, in which nozzles at the edges of a print swath are less used.

In principle, flow chart 600 may be executed without requiring generation of a print mask. In other words, the print mask in flow chart 600 may be stored in a memory element (memory 364 in FIG. 3) and be accessed by a controller (e.g., controller 363) when a print job is to be performed. In other examples, a basic print mask may be stored along with a set of rules of generating the print mask; during printing, the print mask may be generated on the fly. More specifically, a print mask may be dynamically generated based on a basis mask. This basis mask is modified for each pass such that the inkjet nozzles are actuated according to the same nozzle actuation pattern. (Generation of a print mask is described below with respect to FIGS. 10A to 11B to generate the mask data required for firing the nozzles.) Thereby, memory usage for storing print mask data may be reduced. In other examples, a print mask may be generated at the time of printing or at particular events (e.g., a software update or printer calibration).

Figure 7:
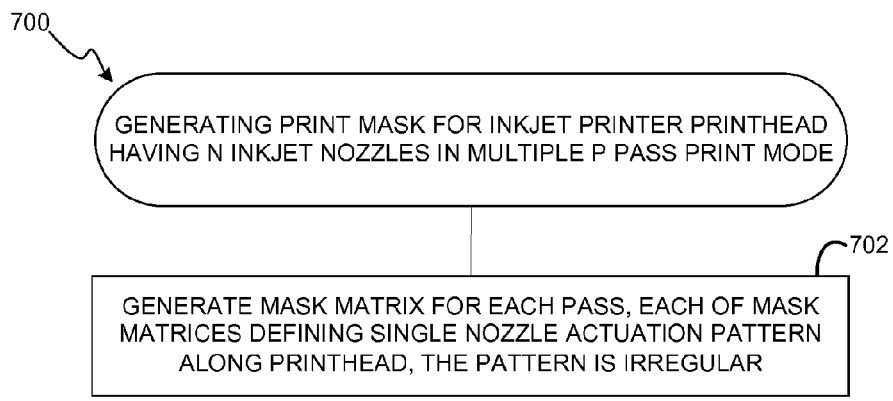
FIG. 7 shows a flow chart that implements examples of methods for generating a print mask for an inkjet printer in multiple P pass print mode.
Figure 8:
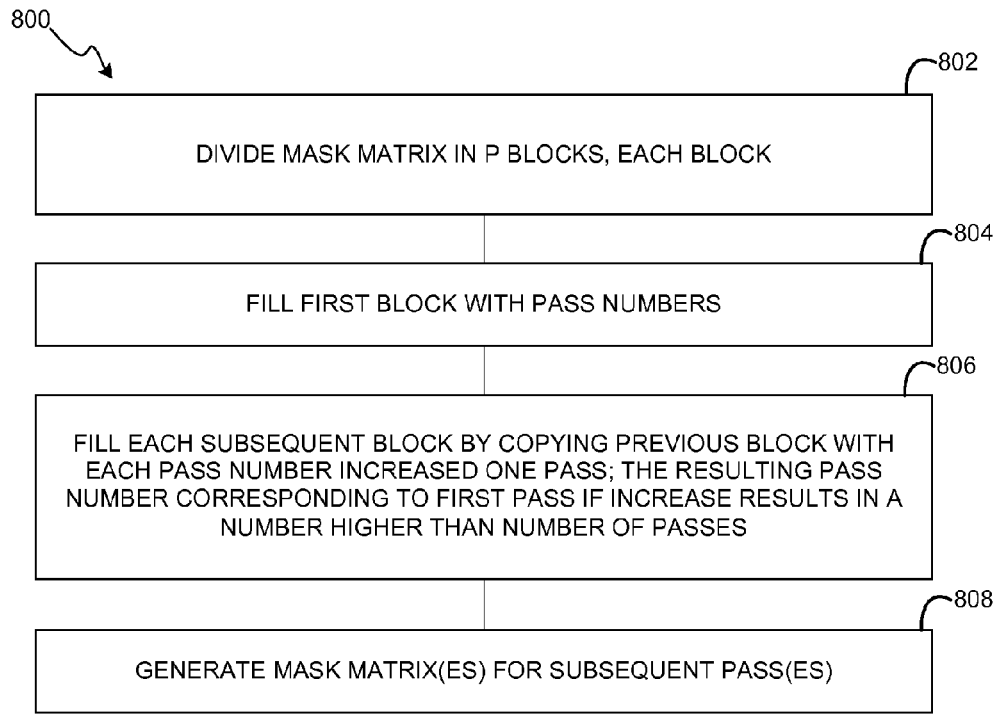
FIG. 8 shows a flow chart that illustrates generation of mask matrices for non-weighted print masks according to examples.
Figure 9:
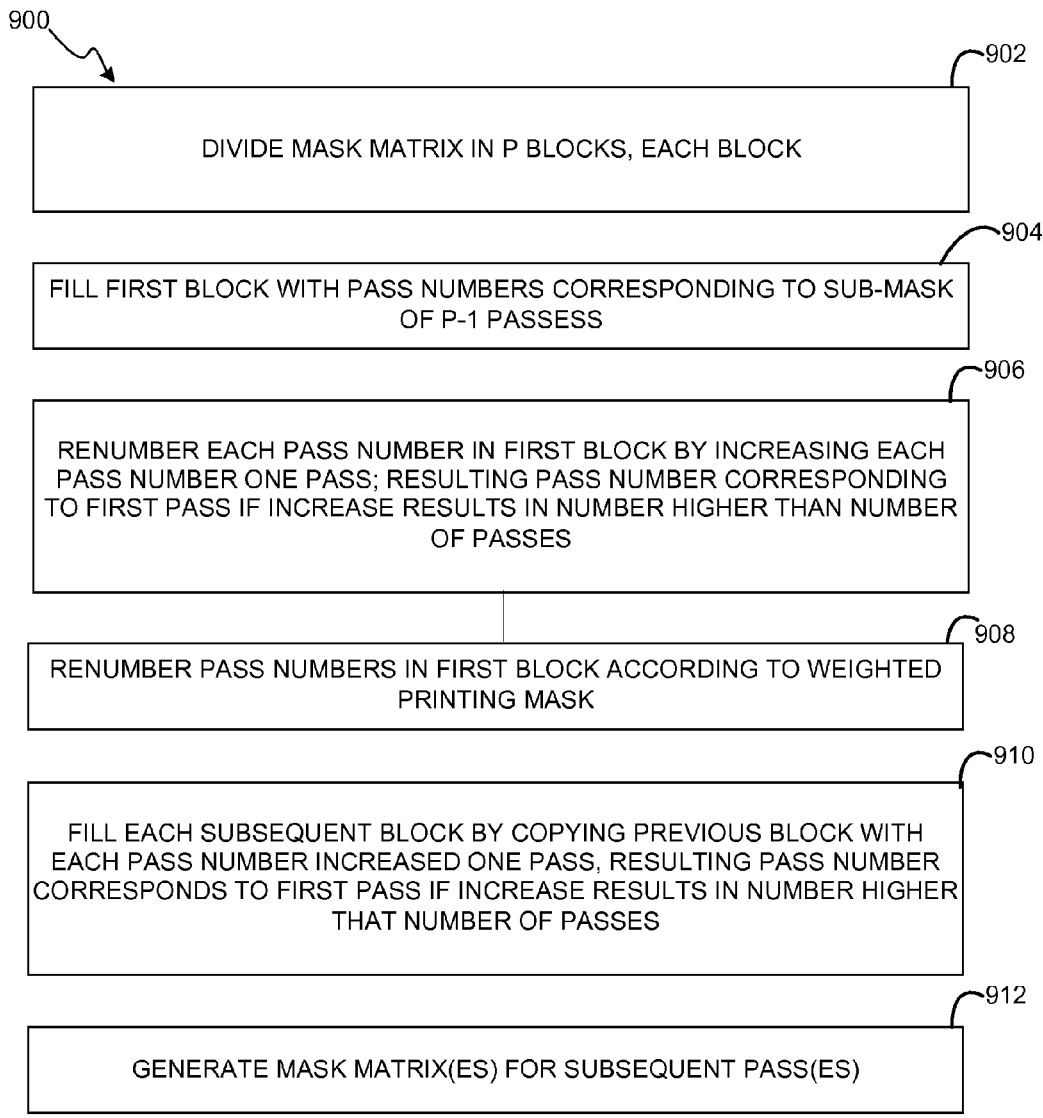
FIG. 9 shows a flow chart that illustrates generation of mask matrices for weighted print masks according to examples.

Methods to generate a print mask as described herein are illustrated with respect to FIGS. 7 to 9. FIG. 7 depicts a flow chart 700 that implements examples of methods for generating a print mask for an inkjet printer in multiple P pass print mode. A print mask generated according to flow chart 700 is to be used with a printer including at least one printhead having a plurality N of inkjet nozzles or inkjet nozzles sub-groups (i.e., N primitives).

At block 702 a mask matrix is generated for each pass, each of the mask matrices defining a single nozzle actuation pattern. The nozzle actuation pattern is irregular. Examples on how mask matrices can be generated according to block 702 are illustrated in the following with respect to FIGS. 8 to 11B. It will be understood that mask matrix generation are not limited to these examples, and that a variety of methods can be used to generate mask matrices according to block 702.

FIG. 8 shows a flow chart 800 that illustrates generation of mask matrices for non-weighted print masks. Such mask matrices are exemplified using FIGS. 10A and 10B. Looking at FIG. 10A, a mask matrix for printhead 1002 is illustrated. Each position of mask matrix 1000 corresponds to a nozzle or a nozzle sub-group in printhead 1002. In particular, each of these nozzles or nozzle sub-groups corresponds to a primitive of printhead 1002. In the illustrated examples, printhead 1002 includes 64 primitives arranged in 16 rows distributed along media advance direction 254 (i.e. along the swath of printhead 1002), and four columns distributed along carriage transition axis 251. The column extension defines a swath of printhead 1002.

Mask matrix 1000 is filled with codes 1006 representing the pass number in which a corresponding nozzle is to be actuated. Codes may be based on any suitable representation that allows associating the content of mask matrices with nozzle fire timing. It will be understood that codes 1006 may adopt a variety of forms. In the illustrated examples of FIG, codes 1006 are pass numbers coded from 0 to P−1, P being the number of passes.

Figures 10A, 10B:
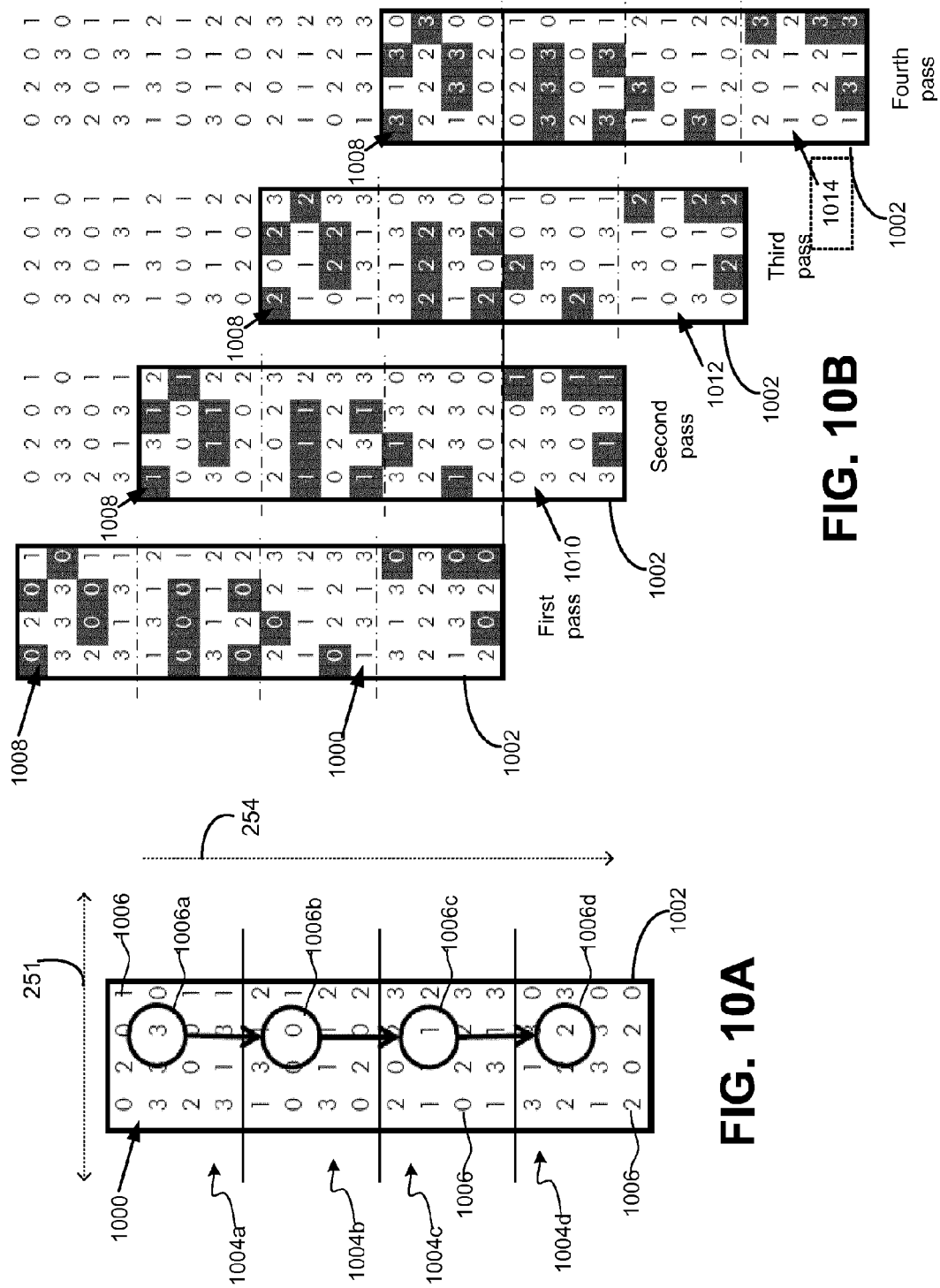
FIGS. 10A and 10B shows diagrams of mask matrices for printheads according to examples.

Referring to FIGS. 8 and 10A, at block 802, mask matrix 1000 is divided in P nozzle groups 1004a to 1004d. Each group is sized N/P (N is the number of primitives; P is the number of passes). In the example of FIG. 10A, each nozzle group has a size of 16 positions.

At block 804, a first nozzle group 1004a is filled with pass numbers. More specifically, codes 1006 are provided at first nozzle group with a representation of pass numbers. The pass numbers used at block 804 for filling first nozzle group 1004a may be chosen randomly. Alternatively, these pass numbers may be selected according to a pre-defined pattern. For example, these pass numbers may be selected based on blue noise. Generally, the resulting mask matrix is defined by the pattern of these pass number. For example, if block 804 is filled according to blue noise, the resulting mask matrix is then also filled according to blue noise.

At block 806, each subsequent nozzle group 1004b-100d is filled by copying therein pass numbers from the previous nozzle group with each pass number increased one pass; the resulting pass numbers correspond to the first pass if the increase results in a number higher than the number of passes. Block 806 is exemplified in FIG. 10A for a portion of mask matrix 1000 by the circles with arrows indicating corresponding positions in the next nozzle group. In the example highlighted in FIG. 10A, at position 1006a, pass number code is 3 (corresponding to the fourth pass). The corresponding position (position 1006b) in the subsequent nozzle group (nozzle group 1004b) is then filled with pass number code 0 (corresponding to the first pass). The corresponding position (position 1006c) in the subsequent nozzle group (nozzle group 1004c) is then filled with pass number code 1 (corresponding to the second pass). The corresponding position (position 1006d) in the subsequent nozzle group (nozzle group 1004d) is then filled with pass number code 2 (corresponding to the third pass). The same logic is followed by all position in mask matrix 1000. Thereby, it is ensured that each pixel location receives at least a minimal amount of ink.

For the first pass, a mask matrix 1000 as defined at block 806 can be used for defining the primitives to be fired in printhead 1002 at the first pass, as shown in FIG. 10B. In this Figure, the nozzle actuation pattern (pattern 1008) is illustrated by highlighted positions in printhead 1002. The pattern depicted is composed of positions corresponding to a code with a pass number equivalent to the active pass number (0 for the first pass; 1 for the second pass; 2 for the third pass; 3 for the fourth pass). In FIG. 10B, nozzle actuation patterns for subsequent passes are illustrated successively to the right. Further, in FIG. 10B, each subsequent pass is illustrated by a downward displacement of printhead 1002. (Pass numbers over the printhead represent pixel locations no longer positioned beneath printhead 1002, the pass number indicating at which pass each pixel location received ink.) For each pass a specific mask matrix is used: a matrix 1010 is generated for the second pass; a matrix 1012 is generated for the third pass; a matrix 1014 is generated for the fourth pass.

In the following it is illustrated how mask matrices for subsequent passes are generated. At block 808, a mask matrix for a subsequent pass is generated. More specifically, mask matrices for each subsequent pass are generated such that (a) nozzle groups first to P−1 correspond to nozzle groups two to P of the mask matrix for the previous pass, and (b) nozzle group P corresponds to nozzle group one of the mask matrix for the previous pass. Referring to the example of FIG. 10B, nozzle groups first to third (i.e., P−1) in matrices 1010, 1012, 1014 correspond to nozzle groups two to fourth (i.e., P) of the mask matrix for the previous pass (separation between nozzle groups are indicated by dotted horizontal lines; numbering of nozzle groups being incremented from upper nozzle group to bottom nozzle group). Further, nozzle group fourth (P) in matrices 1010, 1012, 1014 corresponds to nozzle group one of the mask matrix for the previous pass.

By applying the print mask generation of FIG. 8, and as can be appreciated in FIG. 10B, each of mask matrices 1010, 1012, 1014 results in a single nozzle actuation pattern 1008. Thereby, flow chart 800 facilitates single nozzle actuation patterns using non-weighted pattern masks that do not compromise computational costs in generating the matrices.

FIG. 9 shows a flow chart 900 that illustrates generation of mask matrices for weighted print masks. Such mask matrices are exemplified using FIGS. 11A and 11B. Looking at FIG. 11A, a mask matrix 1100 for printhead 1002 is illustrated. Each position of mask matrix 1100 corresponds to a nozzle or a nozzle sub-group in printhead 1002. More specifically, each of these nozzles or nozzle sub-groups corresponds to a primitive of printhead 1002. Mask matrix 1100 is filled with codes 1006.

Referring to FIGS. 9 and 11A, at block 902, mask matrix 1100 is divided in P nozzle groups 1102a to 1102d analogously as set forth above with respect to block 802 in FIG. 8.

At block 904, first nozzle group 1102a is filled with pass numbers corresponding to a sub-mask of P−1 passes. In the illustrated examples, this filling of first nozzle group 1102a is illustrated by matrix instance 1100' shown at the left of mask matrix 1100. Matrix instance 1100' might be seen as a temporary instance of mask matrix 1100. The pass numbers used at block 904 for filling first nozzle group 1102a may be chosen randomly. Alternatively, these pass numbers may be selected according to a pre-defined pattern. For example, these pass numbers may be selected based on blue noise. Generally, the resulting mask matrix is defined by the pattern of these pass number. For example, if block 904 is filled according to blue noise, the resulting mask matrix is then also filled according to blue noise.

At block 906, pass numbers in first nozzle group 1102a are renumbered by increasing each pass number one pass. (This is indicated in FIG. 11A by the circles with arrows indicating renumbering in the next nozzle group.) The resulting pass numbers correspond to the first pass if the increase results in a number higher than the number of passes. Further, at block 908, pass numbers are renumbered in the first nozzle group according to a weighted printing mask. In some examples, illustrated in FIGS. 11A and 11B, the pass numbers in the first nozzle group are renumbered following a shape of a desired taper. It will be understood that other weighted printing masks than those mentioned above, are foreseen to be implemented at block 908.

In the example illustrated in FIGS. 11A and 11B, at block 906 all pass numbers in matrix instance 1100' excepting those corresponding to the first pass number are renumbered. As can be seen, pass numbers in nozzle group 1102 of mask matrix 1100 corresponds to those in matrix instance 1100' advanced one pass number excepting those pass numbers enclosed in circles 1104' and 1106' (those pass numbers correspond to the first pass). Pass numbers corresponding to the first pass are renumbered according to a weighted mask. This renumbering is reflected by pass numbers in mask matrix 1100 highlighted with arrows from circles 1104' and 1106'. More specifically, for the example of FIGS. 11A and 11B, the weighted printing mask is such that nozzles on the printhead upper edge are less used. As can be seen in FIG. 11A, pass numbers in the two upper rows of nozzle group 1102a are higher than zero; more specifically, zero pass numbers in mask matrix 1100' are incremented one unit in mask matrix 1100 (those positions are highlighted by circles 1104). Thereby, no nozzle is actuated at the upper edge of printhead 1002 (see FIG. 11B). Pass numbers in the other rows that correspond to zero pass numbers in mask matrix 1100' are left unchanged (those positions are highlighted by circles 1106).

Referring back to FIG. 9, at block 910, each subsequent nozzle group 1102b, 1102c, 1102d is filled by copying therein pass numbers from the previous nozzle group with each pass number increased one pass. The resulting pass number corresponds to the first pass if the increase results in a number higher than the number of passes. Block 910 can be implemented analogously as illustrated above with respect to block 806 in FIG. 8.

At block 912, a mask matrix for a subsequent pass is generated. Thereby, mask matrices 1108, 1110, and 1112, depicted in FIG. 11B, are generated. Block 912 can be implemented analogously as illustrated above with respect to block 808 in FIG. 8.

By applying the print mask generation of FIG. 8, and as can be appreciated in FIG. 10B, each of mask matrices 1100, 1108, 1110, and 1112 results in a single nozzle actuation pattern 1008. Thereby, flow chart 800 facilitates single nozzle actuation patterns using non-weighted pattern masks that do not compromise computational costs in generating the matrices.

It will be understood that flow charts 700, 800 or 900 for generation of print mask must not necessarily be implemented within a printing systems. In principle, these flow charts might be implemented by a suitable computer. The blocks in these flow charts might be executed by a computing engine, which might be physically constituted analogously as control engine 108. The computing engine might then execute flow charts as described above so as to generate a print mask including mask matrices for each pass. The print masks may be stored in a memory element, which might be physically constituted similarly as memory 502. The stored print mask might be provided to a printer system in order to print an image on a substrate as described above with respect to FIG. 6.

In some examples, a computer software product comprising a non-transitory medium readable by a processor is envisaged. The medium has stored thereon data for reproducing a print mask generated according to flow charts 700, 800, or 900. More specifically, the print mask might be generated according to the methods of any of claims 1 to 6.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Further, flow charts herein illustrate specific block orders; however, it will be understood that the order of execution may differ from that which is depicted. For example, the order of execution of two or more blocks may be scrambled relative to the order shown. Also, two or more blocks shown in succession may be executed concurrently or with partial concurrence. Further, claims reciting "a" or "an" with respect to a particular element contemplate incorporation of one or more such elements, neither requiring nor excluding two or more such elements. Further, the terms "include" and "comprise" are used as open-ended transitions.

What is claimed is:

1. A method for generating a print mask for an inkjet printer in multiple P pass print mode, the printer including at least one printhead having a plurality N of inkjet nozzles or inkjet nozzles sub-groups, the method comprising generating a mask matrix for each pass of P passes of the multiple P pass print mode, each respective mask matrix of the mask matrices defining a single nozzle actuation pattern, the nozzle actuation pattern being irregular, wherein generating a given mask matrix of the mask matrices comprises:
dividing the given mask matrix into P nozzle groups, each nozzle group of the P nozzle groups sized N/P,
filling a first nozzle group of the P nozzle groups with codes, each code of the codes representing a pass number in which a corresponding inkjet nozzle or inkjet nozzles sub-group is to be actuated, and
filling a second nozzle group of the P nozzle groups with codes that are derived from and different from the codes in the first nozzle group.

2. The method of claim 1, wherein
each position of a mask matrix corresponds to a nozzle or a nozzle sub-group in the printhead.

3. The method of claim 1, wherein the given mask matrix is generated for a pass of the P passes, and wherein filling the second nozzle group comprises:
copying the codes of the first nozzle group into the second nozzle group, and changing the copied codes in the second nozzle group.

4. The method of claim 3, wherein the given mask matrix is for a first pass of the P passes, and wherein generating the mask matrix for a second pass of the P passes comprises:
setting nozzle groups 1 to P−1 of the mask matrix for the second pass equal to corresponding nozzle groups 2 to P of the given mask matrix for the first pass, and
setting nozzle group P of the mask matrix for the second pass equal to nozzle group 1 of the given mask matrix for the first pass.

5. The method of claim 3, wherein changing the copied codes in the second nozzle group comprises increasing by a specified value each of the copied codes in the second nozzle group.

6. The method of claim 5, wherein each of the copied codes includes a pass number, and wherein increasing by the specified value each of the copied codes comprises incrementing each copied pass number in the second nozzle group.

7. The method of claim 1, wherein the codes filled into the first nozzle group include pass numbers, wherein the given mask matrix is generated for a pass of the P passes, and wherein generating the given mask matrix comprises:
    renumbering pass numbers in the first nozzle group by increasing each pass number one pass, the resulting pass number corresponding to the first pass if the increase results in a number higher than the number of passes;
    renumbering pass numbers in the first nozzle group according to a weighted printing mask; and
    filling each subsequent nozzle group by copying therein pass numbers from a previous nozzle group with each pass number increased one pass, the resulting pass number corresponding to the first pass if the increase results in a number higher than the number of passes.

8. The method of claim 7, wherein renumbering pass numbers in the first nozzle group includes renumbering the pass numbers in the first nozzle group following a shape of a target taper.

9. A non-transitory medium readable by a processor, the medium having stored thereon instructions for causing a printing system to print an image on a substrate, the printing system including at least one printhead having a plurality N of inkjet nozzles or inkjet nozzles sub-groups, the instructions upon execution causing the printing system to:
    print on a region of the substrate in a multiple P pass print mode; and
    during printing the image on the substrate, apply, for each pass of P passes of the multiple P pass print mode, a respective mask matrix of a plurality of mask matrices such that, for each pass of the P passes, the inkjet nozzles or the inkjet nozzles sub-groups in the printhead are actuated according to a single nozzle actuation pattern, wherein the nozzle actuation pattern is irregular, and wherein a first mask matrix for a first pass of the P passes is different from a second mask matrix for a second pass of the P passes, wherein the first and second mask matrices are part of the plurality of mask matrices.

10. The non-transitory medium of claim 9, wherein each mask matrix of the plurality of mask matrices is sized to match an arrangement of the inkjet nozzles or inkjet nozzles sub-groups.

11. The non-transitory medium of claim 9, wherein the plurality of print masks are part of a non-weighted print mask.

12. The non-transitory medium of claim 9, wherein the plurality of print masks are part of a weighted print mask.

13. The non-transitory medium of claim 9, wherein causing the printing system to print includes scanning the at least one printhead.

14. The non-transitory medium of claim 9, wherein the instructions upon execution cause the printing system to generate each mask matrix of the plurality of mask matrices based on a basis mask, which is modified for each pass such that the inkjet nozzles are actuated according to the same nozzle actuation pattern.

15. The non-transitory medium of claim 9, wherein the instructions upon execution cause the printing system to:
    generate the plurality of print masks, each print mask of the plurality of print masks comprising a mask matrix, wherein generating a first mask matrix of the plurality of mask matrices comprises:
        dividing the first mask matrix into P nozzle groups, each nozzle group of the P nozzle groups sized N/P,
        filling a first nozzle group of the P nozzle groups with codes, each code of the codes representing a pass number in which a corresponding inkjet nozzle or inkjet nozzles sub-group is to be actuated, and
        filling a second nozzle group of the P nozzle groups with codes that are derived from and different from the codes in the first nozzle group.

16. The non-transitory medium of claim 15, wherein the first mask matrix is generated for a pass of the P passes, and wherein filling the second nozzle group comprises:
    copying the codes of the first nozzle group into the second nozzle group, and
    changing the copied codes in the second nozzle group.

17. A printing system, comprising:
    at least one printhead including a plurality N of inkjet nozzles or inkjet nozzles sub-groups for printing on a region of a substrate; and
    a controller to control ejection of ink through the inkjet nozzles or inkjet nozzles sub-groups in a multiple P pass print mode or inkjet nozzles sub-groups by applying, for each pass of P passes of the multiple P pass print mode, a respective mask matrix of a plurality of mask matrices such that, for each pass of the P passes, the inkjet nozzles or inkjet nozzles sub-groups are actuated according to an irregular nozzle actuation pattern, wherein a first mask matrix for a first pass of the P passes is different from a second mask matrix for a second pass of the P passes, the first and second mask matrices being part of the plurality of matrices.

18. The system according to claim 17, wherein the mask matrix applied at each pass of the P passes is based on a basis mask, which is modified for each pass such that the inkjet nozzles or inkjet nozzles sub-groups are actuated according to the same nozzle actuation pattern.

19. The printing system of claim 17, wherein the controller is to:
    generate the plurality of mask matrices, wherein generating a first mask matrix of the plurality of mask matrices comprises:
        dividing the first mask matrix into P nozzle groups, each nozzle group of the P nozzle groups sized N/P,
        filling a first nozzle group of the P nozzle groups with codes, each code of the codes representing a pass number in which a corresponding inkjet nozzle or inkjet nozzles sub-group is to be actuated, and
        filling a second nozzle group of the P nozzle groups with codes that are derived from and different from the codes in the first nozzle group.

20. The printing system of claim 19, wherein the first mask matrix is generated for a pass of the P passes, and wherein filling the second nozzle group comprises:
    copying the codes of the first nozzle group into the second nozzle group, and
    changing the copied codes in the second nozzle group.

* * * * *